May 5, 1964  J. McCARTNEY  3,132,240
ARC WELDING APPARATUS
Filed Sept. 1, 1961
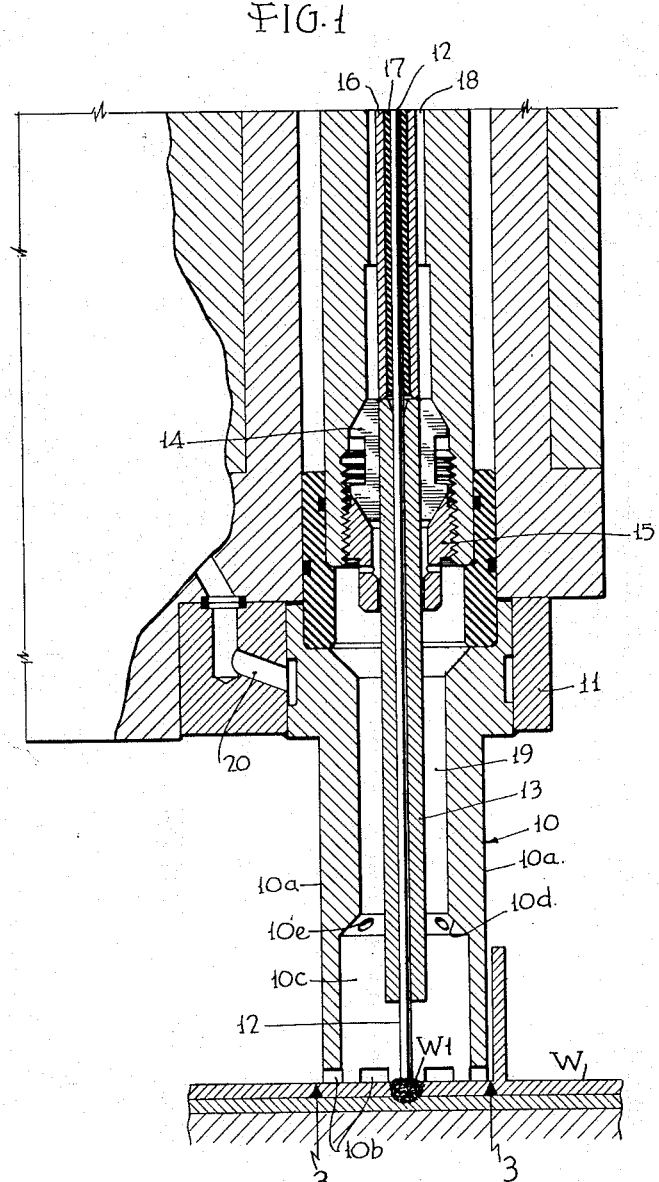
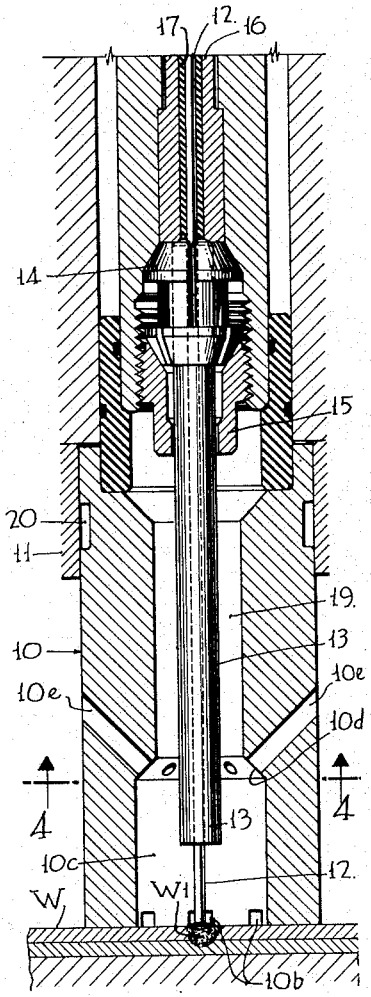
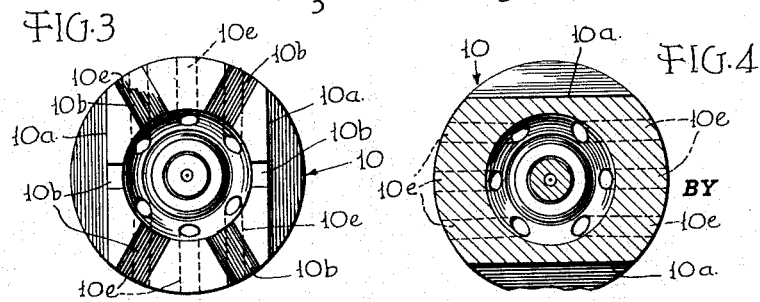
INVENTOR.
John McCartney
BY Wm. R. Glisson
ATTORNEY

United States Patent Office 3,132,240
Patented May 5, 1964

---

3,132,240
ARC WELDING APPARATUS
John McCartney, Willow Grove, Pa., assignor to The Budd Company, Philadelphia, Pa., a corporation of Pennsylvania
Filed Sept. 1, 1961, Ser. No. 135,554
4 Claims. (Cl. 219—127)

This invention relates to arc welding apparatus of the gas-protected consumable electrode type and has for an object the provision of improvements in this art.

One of the particular objects of the invention is to provide an arc welding nozzle which minimizes splattering of metal from the pool against the inside of the nozzle with consequent incrustation requiring frequent celaning or replacement of the nozzle. Another object is to provide an arc welding nozzle having a restricted gas passage alongside the wire electrode guide which extends to a point near the end of the nozzle to direct the stream of gas toward the middle of the molten metal pool to reduce the agitation and repress the level of metal at the middle of the pool to thereby aid in reducing splattering.

Another object is to provide an enlarged gas chamber of short length near the end of the nozzle together with large capacity gas outlet openings whereby the velocity of gas outflow is minimized and the general pressure level inside the nozzle is minimized, thus further reducing splatter.

Another object is to provide a nozzle with peripheral gas outflow openings at a distance above the end of the nozzle to remove gas upwardly as well as laterally from the outer part of the enlarged end chamber to further reduce splattering and accumulation of metal on the inner surface of the nozzle and on the wire guide.

The above and other objects and advantages of the invention will be apparent from the following description of an exemplary embodiment, reference being made to the accompanying drawings wherein:

FIG. 1 is a vertical central section through the nozzle end of an arc welding gun embodying the present invention;

FIG. 2 is a similar view with some parts shown in elevation;

FIG. 3 is a lower end plan view looking upward, the view being taken on the line 3—3 of FIG. 1; and FIG. 4 is a transverse section looking upward, the view being taken on the line 4—4 of FIG. 2.

A nozzle 10 is carried fast on a welding gun support 11. An electrode wire 12 is fed out through a conductive guide tube 13 held by a chuck 14 secured by a sleeve nut 15. An upper wire guide tube 16 carries insulation 17 on the inside and an exterior annular channel 18 is provided for protective gas such as argon, helium and the like, as is well known. The chuck 14 and nut 15 are provided with passages leading the gas to an annular outlet channel 19 around the guide tube 13 within the nozzle.

Means are provided for raising and lowering the gun and moving it about as needed. This particular gun is designed for making spot welds closely adjacent the sides of an upstanding flange so the nozzle is provided with flat sides 10a. A machine may carry a gang of welding guns but only one need be noted. The machine will be provided with means for feeding protective gas at a controlled rate, for feeding wire at a controlled rate, for circulating cooling water through channels 20 and elsewhere as required, and for supplying welding current of desired characteristics at a timed and controlled rate.

The lower end of the nozzle 10 where it engages the workpiece W is provided with gas escape ports 10b, FIG. 3. In prior nozzles there have been ports on the thick sides but herein ports have been added on the thin sides thereby greatly increasing the total size of opening for the escape of gas near the pool W1 of molten metal of the weld.

The nozzle is formed with an enlarged gas chamber 10c at the end, here about 1" in diameter and about 1⅛" long, which is reduced abruptly at an inclined annular shoulder 10d at the end of the restricted annular passage 19 around the wire guide tube 13. Heretofore the large chamber extended up for the full length of the nozzle without a restricted passage for restricting the downflowing gas to a central location.

At the inclined shoulder 10d there are provided a number of gas outlet ports 10e which are inclined upwardly and outwardly.

The present arrangement has been found to give most unusual advantages in use. Whereas prior nozzles, with no restricted gas delivery channel, with a long large gas chamber, with end escape ports only on the thick sides, with no restrictive end chamber shoulder, and with no backward leading escape ports, have become so encrusted with splattered metal (aluminum in the case referred to) that they had to be cleaned after about thirty (30) welds; the improved nozzles have made over one thousand (1,000) welds and then were much easier to clean than the prior nozzle. The accumulation was largely as a ring on the shoulder 10d and had little tenacity of adhesion, possibly because it had more time to cool before it was deposited.

The reasons why the improved nozzle gives such improvement in this respect are not fully understood; but the concentrated central downflow of gas and the easy outflow of gas around the outside of the large end chamber, especially the backflow near the outer side and out the upper ports 10e, appears to be a material factor. Not only is there less incrustation of splattered metal within the nozzle, but the welds are more uniformly perfect and there is much less violence and explosive eruption in the weld pool.

While one embodiment of the invention has been described for purposes of illustration, it is to be understood that there may be various embodiments and modifications within the general scope of the invention.

What is claimed is:

1. Arc welding apparatus comprising in combination, a holder, a tubular nozzle carried by said holder, and an electrode wire guide in said nozzle, said nozzle having an annular restricted gas supply channel surrounding said wire guide and an enlarged chamber at the end, the nozzle also having gas escape ports at its end, said enlarged end chamber terminating at its upper end in an annular shoulder, and said nozzle having gas escape ports through its sides adjacent said shoulder.

2. Arc welding apparatus comprising in combination, a holder, a tubular nozzle carried by said holder, and an electrode wire guide in said nozzle, said nozzle having an annular restricted gas supply channel surrounding said wire guide and an enlarged chamber at the end, the nozzle also having gas escape ports at its end, said enlarged end chamber terminating at its upper end in an inclined annular shoulder, and said nozzle having upwardly and outwardly inclined gas escape ports through its sides starting interiorly in said inclined shoulder.

3. A gas shielded arc welding apparatus comprising in combination, an electrode holder, an electrically conductive electrode guide mounted in said holder, a gas inlet channel in said holder and outside said electrode guide, a nozzle throat connected to said holder, said nozzle throat forming a gas conduit around said electrode guide interconnected with said gas inlet channel, a nozzle cup connected to said nozzle throat, said cup having a plurality of escape ports at its free end to permit the escape of gas therefrom, and a plurality of back pressure outlet ports located opposite said electrode guide at the connection of said nozzle cup and said nozzle throat to partially relieve the pressure of said gas entering said cup.

4. A gas shielded arc welding apparatus comprising in combination, an electrode holder, an electrode guide mounted in said holder, a gas inlet channel in said holder and outside said electrode guide, a nozzle throat connected to said holder, said nozzle throat forming a gas conduit around said electrode guide interconnected with said gas inlet channel, a nozzle cup connected to said nozzle throat, said cup forming an enlarged extension of said nozzle throat and having a plurality of escape ports at its free end to permit the escape of gas therefrom, and a plurality of back pressure outlet ports located at the connection of said nozzle cup and said nozzle throat to partially relieve the pressure of said gas entering said cup.

References Cited in the file of this patent

UNITED STATES PATENTS

| | | |
|---|---|---|
| 2,590,084 | Bernard | Mar. 25, 1952 |
| 2,862,099 | Gage | Nov. 25, 1958 |
| 2,922,023 | Hackman et al. | Jan. 19, 1960 |
| 2,965,745 | Hardy et al. | Dec. 20, 1960 |

FOREIGN PATENTS

| | | |
|---|---|---|
| 798,292 | Great Britain | July 16, 1958 |